United States Patent [19]

Cheng

[11] Patent Number: 5,854,735

[45] Date of Patent: Dec. 29, 1998

[54] DEVICE FOR TILTABLY SUPPORTING A LCD

[75] Inventor: Yung-Long Cheng, Taipei, Taiwan

[73] Assignee: ADI Corporation, Taichung Hsien, Taiwan

[21] Appl. No.: 872,173

[22] Filed: Jun. 10, 1997

[30] Foreign Application Priority Data

Nov. 16, 1996 [TW] Taiwan ................................ 85217569

[51] Int. Cl.⁶ .............................. G06F 1/16; H05K 7/16
[52] U.S. Cl. ...................... 361/681; 248/371; 248/923; 16/340
[58] Field of Search ..................... 364/708.1; 361/681, 361/682; 16/340, 337, 342; 248/371, 398, 349.1, 917, 919, 921, 922, 923

[56] References Cited

U.S. PATENT DOCUMENTS

| | | | |
|---|---|---|---|
| 5,205,017 | 4/1993 | Wang | 361/681 X |
| 5,537,290 | 7/1996 | Brown et al. | 361/681 |
| 5,702,197 | 12/1997 | Chen | 16/342 X |
| 5,715,137 | 2/1998 | Choi | 361/681 |

*Primary Examiner*—Lynn D. Feild
*Attorney, Agent, or Firm*—Bacon & Thomas

[57] ABSTRACT

A LCD support structure including an upright support supported on a rotary table, and a LCD holder mounted on the stand to hold a LCD, permitting the LCD to be tilted forwards and backwards within a limited angle, the LCD holder including a mounting base fixedly fastened to the upright support, a holder base fixedly mounted on the LCD, and two coupling devices bilaterally coupled between the mounting base and the holder base, enabling the holder base to be tilted forwards and backwards within a predetermined angle relative to the mounting base.

3 Claims, 6 Drawing Sheets

DEVICE FOR TILTABLY SUPPORTING A LCD

BACKGROUND OF THE INVENTION

The present invention relates to a LCD (liquid crystal display) support structure for supporting a LCD on a desk, and more particularly to such a LCD support structure which permits the LCD to be tilted forwards or backwards.

Regular monitors commonly occupy much table space because they use a cathode ray tube for producing pictures. Recently, a variety of LCDs (liquid crystal displays) have been well developed, and are intensively used to replace conventional monitors. However, when these LCDs are used and supported on a desk or the like, they cannot be adjusted to the desired tilting angle.

SUMMARY OF THE INVENTION

The present invention solves the aforedescribed problem. It is therefore the major object of the present invention to provide a LCD support structure which permits the LCD to be tilted forwards or backwards to the desired angle. According to the preferred embodiment of the present invention, the LCD support structure comprises an upright support supported on a rotary table, and a LCD holder mounted on the stand to hold a LCD, permitting the LCD to be tilted forwards and backwards within a limited angle. The LCD holder comprises a mounting base fixedly fastened to the upright support, a holder base fixedly mounted on the LCD, and two coupling devices bilaterally coupled between the mounting base and the holder base, enabling the holder base to be tilted forwards and backwards within a predetermined angle relative to the mounting base.

DETAILED DESCRIPTION OF THE PREFERRED EMBODIMENT

Figure 1:
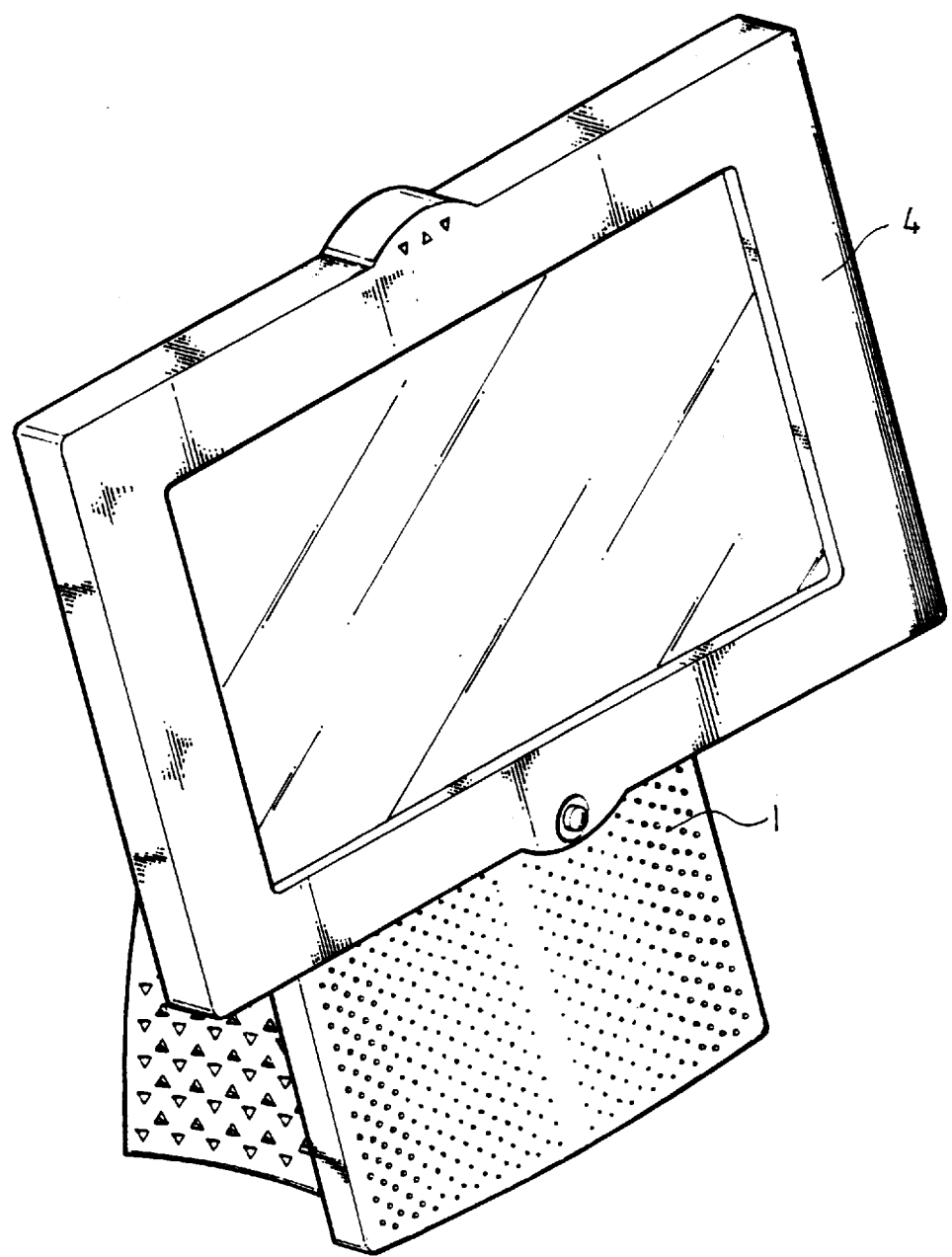
FIG. 1 is an elevational view of the present invention.
Figure 2:
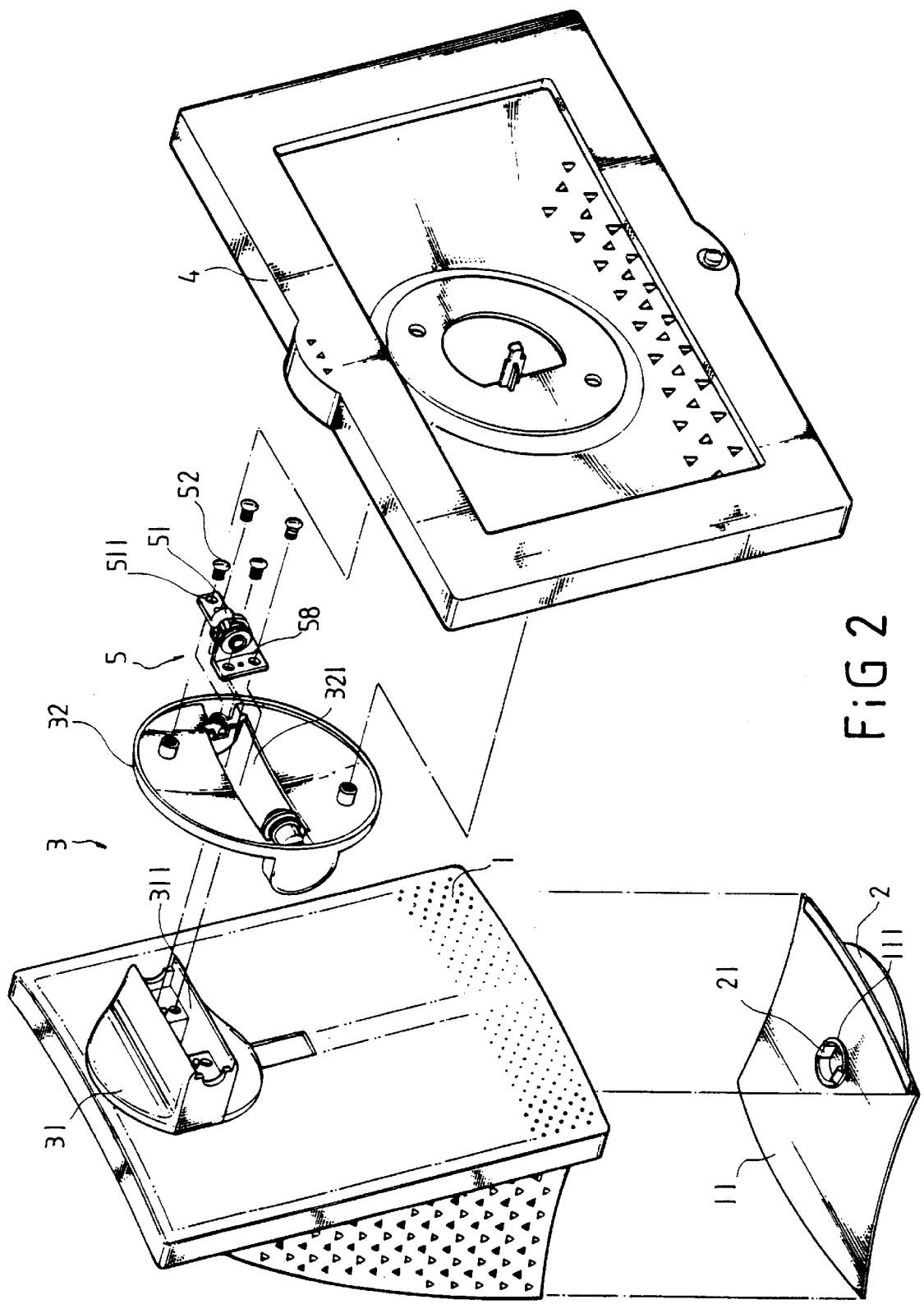
FIG. 2 is an exploded perspective view of the present invention.

Referring to FIGS. 1 and 2, the LCD support structure shown is used in a computer system, however it can also be used in other fields for monitoring purpose. As illustrated, the LCD support structure comprises a rotary table 2, and an upright support 1 rotatably supported on the rotary table 2. The upright support 1 and the rotary table 2 form a stand for supporting a LCD 4. The upright support 1 has a flat bottom 11, and a through hole 111 at the bottom 11. The rotary table 2 has an upright bolt 21 fastened to the through hole 111 of the upright support 1, permitting the upright support 1 to be turned with the rotary table 2 horizontally through 360°.

A LCD holder 3 is fixedly mounted on the upright support 1 at one side near the top. The LCD holder 3 comprises a mounting base 31 fixedly secured to the upright support 1, and a holder base 32 fixedly secured to the LCD 4 at the back and coupled to the mounting base 31. The mounting base 31 and the holder base 32 are respectively fastened to the upright support 1 and the LCD 4 by conventional techniques. The mounting base 31 comprises a chamber 311 at the side which is not fixed to the upright support 1. The holder base 32 is pivoted to the mounting base 31 by two coupling devices 5, having an opening 321 adapted for receiving the chamber 311 of the mounting base 31. The coupling devices 5 are bilaterally connected between the chamber 311 of the mounting base 31 and the holder base 32.

Figure 3:
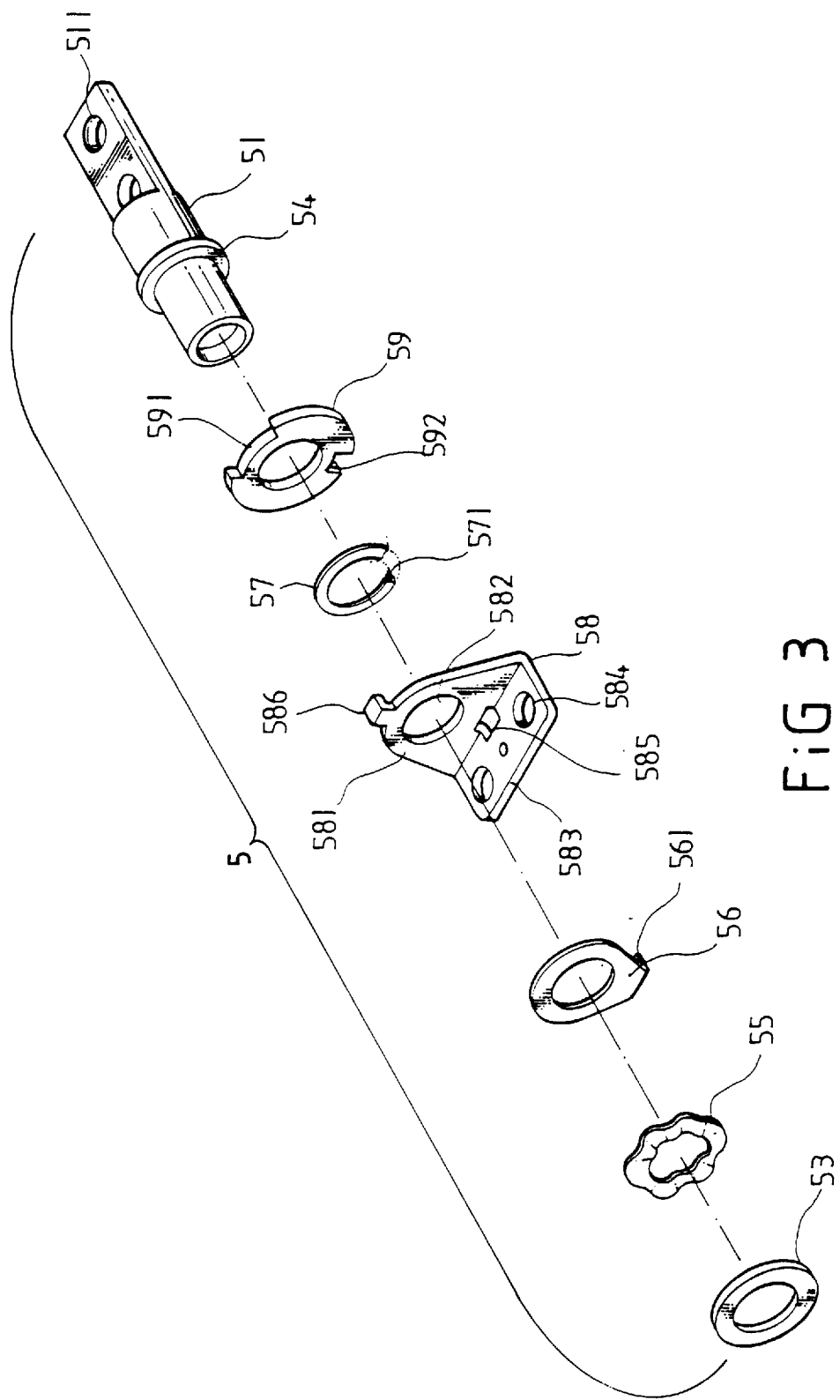
FIG. 3 is an exploded view of a coupling device according to the present invention.
Figure 4:
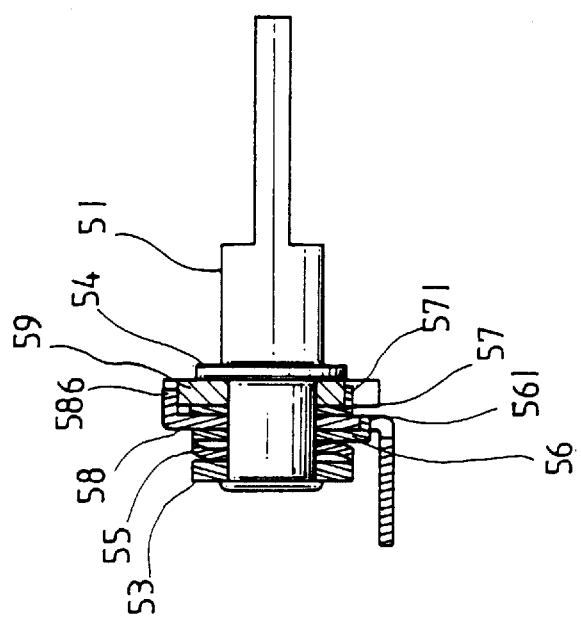
FIG. 4 is a sectional assembly view of the coupling device shown in FIG. 3.

Referring to FIGS. 3 and 4, the coupling device 5 comprises a pivot shaft 51 having at least one mounting hole 511 respectively fastened to the holder base 32 by a respective screw 52 (see also FIG. 6), a first partition plate 53 and a second partition plate 54 fixedly mounted around the pivot shaft 51 at one end remote from the at least one mounting hole 511, a corrugated spring plate 55 mounted around the pivot shaft 51 between the partition plates 53;54, a first friction ring plate 56 mounted around the pivot shaft 51 between the corrugated spring plate 55 and the second partition plate 54 and having a projecting strip 561, a second friction ring plate 57 mounted around the pivot shaft 51 between the second partition plate 54 and the first friction ring plate 56 and having a projecting strip 571, a substantially L-shaped mounting plate 58 turned about the pivot shaft 51 between the first friction ring plate 56 and the second friction ring plate 57 and fixedly fastened to the inside of the chamber 311 of the mounting base 31, and a locating plate 59 fixedly mounted around the pivot shaft 51 between the second partition plate 54 and the second friction ring plate 57. The mounting plate 58 comprises a vertical wall 581 having a pivot hole 582 which receives the pivot shaft 51, a horizontal wall 583 having at least one mounting hole 584 fastened to the chamber 311 of the mounting base 31, a retaining hole 585 disposed at the connecting area between the vertical wall 581 and the horizontal wall 583 and fastened to the projecting strip 561 of the first friction ring plate 56 to stop the friction ring plate 56 from rotary motion relative to the pivot shaft 51, and a projecting stop rod 586 raised from the topmost edge of the vertical wall 581 and adapted to limit the turning angle of the locating plate 59 and the pivot shaft 51. The locating plate 59 has an arched recess 591 at the top side which receives the projecting stop rod 586 of the mounting plate 58, and a retaining notch 592 at the bottom side forced into engagement with the projecting strip 571 of the second friction ring plate 57. The angle of the arched recess 591 is made subject to the tilting angle of the LCD 4 desired.

Figure 5:
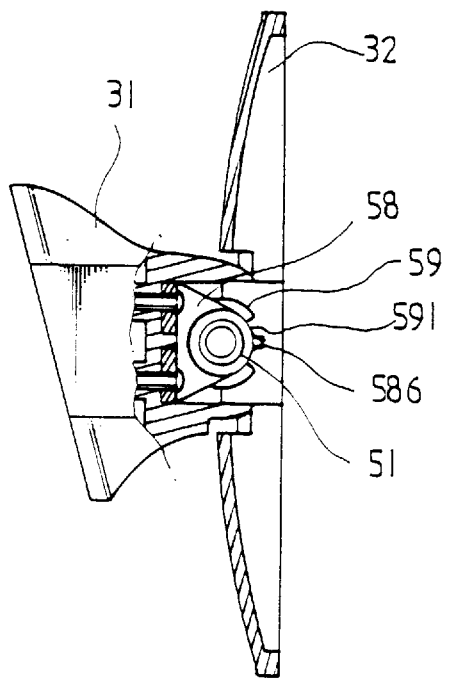
FIG. 5 is a sectional assembly view of one part of the present invention, showing the coupling devices coupled between the mounting base and the holder base.
Figure 6:
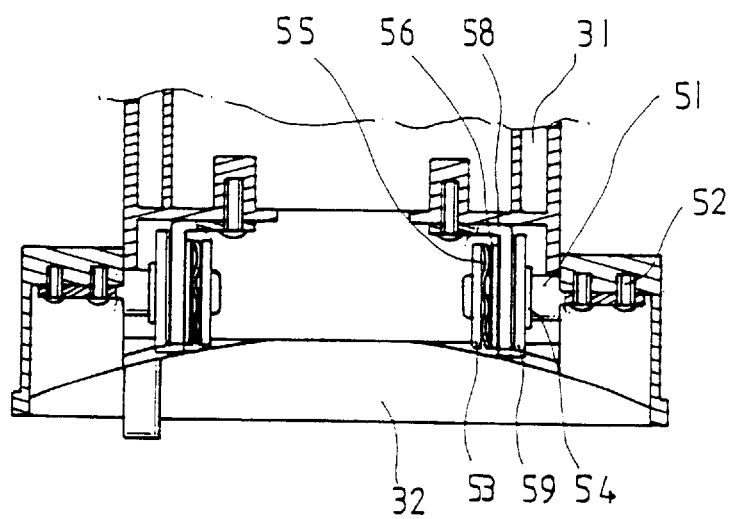
FIG. 6 is a top view of FIG. 5.

Referring to FIGS. 5 and 6, and FIG. 2 again, when the horizontal wall 583 of the mounting plate 58 of each coupling device 5 is respectively fastened to the mounting base 31 and the pivot shaft 51 of each coupling device 5 is respectively fastened to the holder base 32, the LCD 4 is allowed to be tilted forwards or backwards on the upright support 1.

Figure 7:
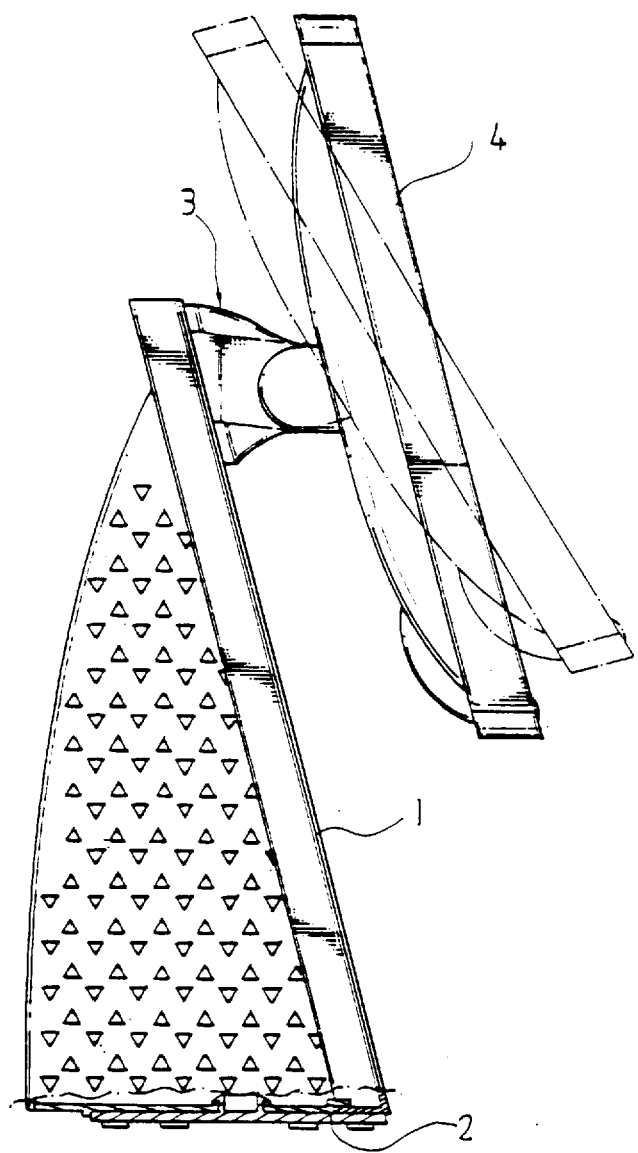
FIG. 7 is a side view of the present invention, showing the tilting angle adjustment of the LCD.

Referring to FIG. 7 and FIGS. from 4 to 6 again, when the LCD 4 is turned with the hand, the pivot shaft 51 of each coupling device 5 is relatively turned in the pivot hole 582 of the corresponding mounting plate 58, and the arched recess 591 of the locating plate 59 is moved with the pivot shaft 51 relative to the projecting stop rod 586 of the mounting plate 58 to limit the tilting angle of the LCD 4 relative to the upright support 1.

While only one embodiment of the present invention has been shown and described, it will be understood that various modifications and changes could be made thereunto without departing from the spirit and scope of the invention disclosed.

What the invention claimed is:

1. A LCD support structure comprising a stand, and a LCD holder mounted on said stand to hold a LCD (liquid crystal display), permitting said LCD to be tilted forwards and backwards within a limited angle, said LCD holder comprising a mounting base fixedly fastened to said stand, a holder base fixedly mounted on said LCD, and at least one coupling device coupled between said mounting base and said holder base, enabling said holder base to be tilted forwards and backwards within a predetermined angle relative to said mounting base, and wherein said stand comprises an upright support adapted to hold said mounting base of said LCD holder and having a bottom and a through hole at said bottom, and a rotary table having an upright bolt fastened to the through hole of said upright support, permitting said upright support to be turned with said rotary table horizontally through 360°.

2. The LCD support structure of claim 1, wherein each of said at least one coupling devices comprises a pivot shaft having one end fixedly fastened to said holder base, a first partition plate and a second partition plate fixedly mounted around said pivot shaft, a corrugated spring plate mounted around said pivot shaft between said first and second partition plates, a first friction ring plate mounted around said pivot shaft between said corrugated spring plate and said second partition plate, a second friction ring plate mounted around said pivot shaft between said second partition plate and said first friction ring plate, a substantially L-shaped mounting plate, said pivot shaft being rotatably engaged through said mounting plate and the mounting plate being disposed between said first friction ring and said second friction ring plate and fixedly fastened to the mounting base of said LCD holder, and a locating plate fixedly mounted around said pivot shaft between said second partition plate and said second friction ring plate and having an arched recess, said L-shaped mounting plate having a projecting stop rod inserted into the arched recess of said locating plate to limit the turning angle of said locating plate and said pivot shaft relative to said L-shaped mounting plate.

3. The LCD support structure of claim 2 wherein the angle of the arched recess of said locating plate is made subject to the desired angle within which said LCD is to be tilted.

* * * * *